(12) United States Patent
Rajaraman et al.

(10) Patent No.: US 8,168,697 B2
(45) Date of Patent: May 1, 2012

(54) COLOR BIOFIBER FOR PLASTIC ARTICLES

(75) Inventors: Hari Rajaraman, Hudson, OH (US);
Stephen J. Cranney, Dacula, GA (US);
Thomas M. Majewski, Parma, OH (US)

(73) Assignee: Polyone Corporation, Avon Lake, OH (US)

( * ) Notice: Subject to any disclaimer, the term of this patent is extended or adjusted under 35 U.S.C. 154(b) by 949 days.

(21) Appl. No.: 12/180,362

(22) Filed: Jul. 25, 2008

(65) Prior Publication Data

US 2009/0035573 A1 Feb. 5, 2009

Related U.S. Application Data

(60) Provisional application No. 60/951,996, filed on Jul. 26, 2007.

(51) Int. Cl.
*C08K 9/10* (2006.01)

(52) U.S. Cl. ............. 523/210; 523/351; 524/13; 524/14

(58) Field of Classification Search .................. 523/210, 523/351; 524/13, 14
See application file for complete search history.

(56) References Cited

U.S. PATENT DOCUMENTS

| | | |
|---|---|---|
| 3,943,079 A | 3/1976 | Hamed |
| 4,113,650 A | 9/1978 | Putman et al. |
| 4,176,096 A | 11/1979 | Patterson et al. |
| 4,510,206 A | 4/1985 | Shuman |
| 5,516,472 A | 5/1996 | Laver |
| 5,593,625 A | 1/1997 | Riebel et al. |
| 5,614,570 A | 3/1997 | Hansen et al. |
| 5,635,123 A | 6/1997 | Riebel et al. |
| 5,759,680 A | 6/1998 | Brooks et al. |
| 6,200,372 B1 * | 3/2001 | Krishnan et al. ........... 106/31.73 |
| 6,207,228 B1 | 3/2001 | Hundt et al. |
| 6,224,284 B1 | 5/2001 | Sukhna et al. |
| 6,537,653 B1 | 3/2003 | Goto et al. |
| 6,821,631 B2 | 11/2004 | Grantham et al. |
| 2004/0076847 A1 | 4/2004 | Saunders, Jr. et al. |
| 2006/0252901 A1 | 11/2006 | Narayan et al. |
| 2007/0077837 A1 | 4/2007 | Lundquist |
| 2007/0122609 A1 | 5/2007 | Hiltzik et al. |
| 2008/0119589 A1 | 5/2008 | Majewski et al. |
| 2008/0145637 A1 | 6/2008 | Frank |

FOREIGN PATENT DOCUMENTS

WO    WO2005097444 A    10/2005

OTHER PUBLICATIONS

Abstract for KR20070067445 (2007).

* cited by examiner

*Primary Examiner* — Edward Cain
(74) *Attorney, Agent, or Firm* — John H. Hornickel

(57) ABSTRACT

Coated colored biofiber for thermoplastic articles is disclosed. The coating on the biofiber comprises film-forming polymeric binder, surfactant, and colorant. The colorant can be one or more pigments, one or more dyes, or combinations thereof. The coated colored biofiber can be used in thermoplastic compounds to simulate the appearance of natural wood while adding durability.

16 Claims, 2 Drawing Sheets
(2 of 2 Drawing Sheet(s) Filed in Color)

Comparative Example B

Example 4

Example 3

COLOR BIOFIBER FOR PLASTIC ARTICLES

CLAIM OF PRIORITY

This application claims priority from U.S. Provisional Patent Application Ser. No. 60/951,996 bearing Attorney Docket Number 12007005 and filed on Jul. 26, 2007, which is incorporated by reference.

FIELD OF THE INVENTION

This invention relates to use of a colorant composition to coat biofiber for use in plastic articles to simulate the appearance of natural wood articles.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products. Recently, an entire industry has arisen called "wood polymer composites" (WPC).

Wood polymer composites are based on the premise that use of biofiber, such as wood fiber and other naturally occurring particulates, as additives to thermoplastic compounds can simulate the appearance of wood while also providing the durability of plastic. Outdoor decorative and structural wood building materials, such as decking, railings, windows, etc. are being made from WPC materials.

The ability of the WPC material to simulate the appearance of the natural wood, including its surface texture and wood grain coloration is key to value of the WPC to successfully replace the natural wood itself. Moreover, use of common wood fiber, such as pine, to simulate the appearance of exotic wood is environmentally friendly.

The art has attempted, without success, to provide durable coloration of WPC materials. Inevitably, the coloration is added as a part of the thermoplastic compounding process, but association of the pigment or dye of such coloration with the wood fiber is circumstantial at best.

U.S. Patent Publication 2004/0076847 (Saunders Jr. et al.), now abandoned during examination, taught the attempt to color the wood fiber with commercially available pigment dispersions or dye solutions which also contained adjuvants such as thickeners, surfactants, etc. U.S. Pat. No. 6,207,228 (Hundt et al.) taught the use of impregnated waste wood to be bound on the one hand to make plasticized wood products and coloration of wood on the other hand with color impregnating agents of pigment or dye plus fillers or extenders.

SUMMARY OF THE INVENTION

What the art needs is a composition to durably color biofiber, such as wood fiber or wood flour, so that the colored biofiber can be used with thermoplastic compounds to simulate the appearance of natural wood.

The present invention solves the problem in the art by using a liquid colorant composition to coat, durably, biofiber with colorant.

One aspect of the invention is a colorant composition for biofiber, comprising: (a) a carrier; (b) binder; (c) colorant; and (d) surfactant, and optionally (e) at least one functional additive, such as a pH modifier and a defoaming agent.

Another aspect of the invention is a method of coloring biofiber, comprising the steps of: (a) preparing a colorant composition described above, and (b) mixing the colorant composition and biofiber at an elevated temperature for sufficient time to permit the carrier to be removed and allowing the other ingredients of the colorant composition to form an colored coating on at least a portion of the biofiber.

Another aspect of the invention is a coated colored biofiber made using the colorant composition described above.

Another aspect of the invention is a compound of thermoplastic resin and coated colored biofiber described above.

One feature of the present invention is that coated colorant on the biofiber remains durably on the biofiber in subsequent compounding of the biofiber with thermoplastic compounding ingredients.

Another feature of the invention is improving the durability of colored biofiber by coating the biofiber with UV absorbers and photo-stabilizers.

Another aspect of the invention is improving the durability of colored biofiber by coating the biofiber with inorganic binders such as sodium silicate.

Other features will become apparent from a description of the embodiments of the invention in relation to the following drawings.

BRIEF DESCRIPTION OF THE DRAWING

The file of this patent contains at least one drawing executed in color. Copies of this patent with color drawings will be provided by the Patent and Trademark Office upon request and payment of the necessary fee.

EMBODIMENTS OF THE INVENTION

Colorant Composition

Carrier

Figure 1:
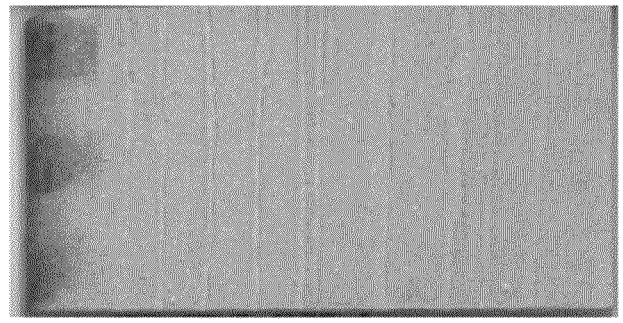
FIG. 1 is a comparison photo image of samples of compounds of the present invention and a control.
Figure 1:
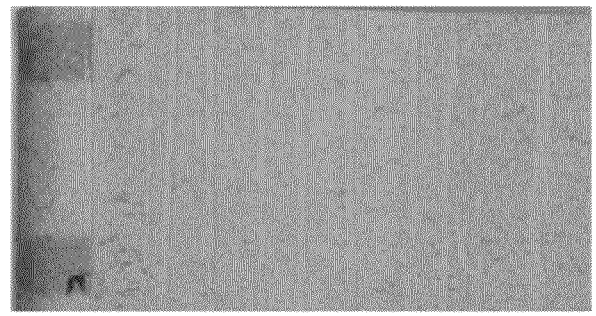
Figure 1:
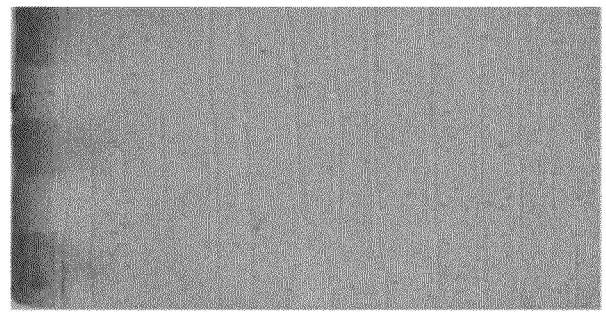

The carrier can be any liquid having a vapor pressure at a temperature of less than about 100° C. to rapidly evaporate during mixing of the colorant composition with the biofiber. Organic liquids are acceptable, but water is preferred because of its environmental benignity.

Binder

The binder can be any polymer capable of melting at a temperature of less than about 100° C. but also capable of forming a film at a temperature above about 25° C. Preferably, the binder is compatible with such polymer resins as polyolefins and polyvinyl halides. As such, the binder which covers the biofiber can permit good dispersion and easier mixing of the biofiber in the filled polymer compound, than if the binder were incompatible with the polymer resin into which the coated biofiber is mixed.

Non-limiting examples of film-forming polymers are acrylics, styrene-acrylics, styrene-butadienes, polyurethanes, vinyl acetate, vinyl acrylics, and the like. Of these, a styrenic-acrylic emulsion marketed as Esicryl 740 from Cook Composites of Kansas City is preferred.

Colorant

Colorant can be a pigment, a dye, a combination of pigments, a combination of dyes, a combination of pigments and dye, a combination of pigment and dyes, or a combination of pigments and dyes. The choice of colorants depends on the ultimate color desired by the designer for the biofiber in the plastic article. Pigments are preferred for durability to resist discoloration because of exposure to ultraviolet light.

The science of color is well known to those skilled in the art. Without undue experimentation, one can use color matching techniques to identify a particular location in spherical color space. For example, one skilled in the art can use the teachings of PCT Patent Application US2004/012233 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Bayer, Ciba-Geigy, Color-Chem International, Sun Chemical, Zhuhai Skyhigh Chemicals, and others identified at Internet Web Sites such as http://www.colorpro.com/info/vendors/colorant.html and http://dir.yahoo.com/Business and Economy/Business to Business/Chemicals and Allied Products/Pigments and Dyes/

Table 1 lists 51 commercially available pigment colorants in a variety of primary and secondary colors, 47 chromatics, 3 blacks, and 1 white.

TABLE 1

Commercial Pigment Colorants

| Raw Material Name | CI_Name | Family | COLOR | FDA* |
|---|---|---|---|---|
| TIOXIDE R-FC6 WHITE | PIGMENT WHITE 6 | INORGANIC | WHITE | Y |
| REGAL 660R BLACK POWDER | PIGMENT BLACK 7 | ORGANIC | | N |
| MPC CHANNEL BLACK | PIGMENT BLACK 7 | ORGANIC | | Y |
| BK-5099 BLACK OXIDE | PIGMENT BLACK 11 | INORGANIC | | N |
| HELIOGEN BLUE K7090 | PIGMENT BLUE 15:3 | ORGANIC | BLUE | Y |
| Heliogen Blue K6903 | PIGMENT BLUE B 15:1 | ORGANIC | BLUE | Y |
| 34L2000 AZURE BLUE | PIGMENT BLUE 28 | INORGANIC | BLUE | Y |
| 34L2001 AMAZON BLUE | PIGMENT BLUE 36 | INORGANIC | BLUE | N |
| NUBIX G-58 ULTRAMARINE BLUE | PIGMENT BLUE 29 | INORGANIC | BLUE | Y |
| NUBIX C-84 ULTRAMARINE BLUE | PIGMENT BLUE 29 | INORGANIC | BLUE | Y |
| NUBIX E-28 ULTRAMARINE BLUE | PIGMENT BLUE 29 | INORGANIC | BLUE | Y |
| HELIOGEN GREEN K-8730 | PIGMENT GREEN 7 | ORGANIC | GREEN | Y |
| HELIOGEN GREEN K 8605 | PIGMENT GREEN 7 | ORGANIC | GREEN | Y |
| CHROMIUM OXIDE GREEN G-6099 | PIGMENT GREEN 17 | INORGANIC | GREEN | Y |
| CROMOPHTAL ORANGE GP | PIGMENT ORANGE 64 | ORGANIC | ORANGE | Y |
| 2920 BRILLIANT ORANGE | PIGMENT ORANGE 79 | ORGANIC | ORANGE | Y |
| NOVAPERM RED F5RKA | PIGMENT RED 170 | ORGANIC | RED | N |
| 225-2480 Sunbrite Scarlet 60:1 | Pigment Red 60:1 | ORGANIC | RED | N |
| IRGALITE RED LCB | PIGMENT RED 53:1 | ORGANIC | RED | N |
| DCC-2782 Barium 2B | Pigment Red 60:1 | ORGANIC | RED | N |

TABLE 1-continued

Commercial Pigment Colorants

| Raw Material Name | CI_Name | Family | COLOR | FDA* |
|---|---|---|---|---|
| Red Lithol Scarlet 4451 | Pigment Red 48:2 | ORGANIC | RED | N |
| CROMOPHTAL RED 2020 | PIGMENT VIOLET 19 | ORGANIC | RED | Y |
| CROMOPHTAL MAGENTA P | PIGMENT RED 202 | ORGANIC | RED | Y |
| CROMOPHTAL PINK PT | PIGMENT RED 122 | ORGANIC | RED | N |
| PALIOGEN RED K 3911 HD | PIGMENT RED 178 | ORGANIC | RED | Y |
| CROMOPHTAL RED 2030 | PIGMENT RED 254 | ORGANIC | RED | Y |
| CROMOPHTAL RED 2028 | PIGMENT RED 254 | ORGANIC | RED | Y |
| Colortherm Red 110M | PIGMENT RED 101 | INORGANIC | RED | Y |
| Colortherm Red 130M | PIGMENT RED 101 | INORGANIC | RED | Y |
| Colortherm Red 180M | PIGMENT RED 101 | INORGANIC | RED | Y |
| CINQUASIA VIOLET RT-891-D | PIGMENT VIOLET 19 | ORGANIC | VIOLET | Y |
| CROMOPHTAL VIOLET GT | PIGMENT VIOLET 23 | ORGANIC | VIOLET | N |
| PREMIER VU UMV (6112) | PIGMENT VIOLET 15 | INORGANIC | VIOLET | Y |
| SICOTAN BROWN K 2750 FG | PIGMENT YELLOW 164 | INORGANIC | BROWN | N |
| FERRITAN FZ-1000 | PIGMENT YELLOW 119 | INORGANIC | Tan | Y |
| NUBITERM Y-905K ZINC FERRITE | PIGMENT YELLOW 119 | INORGANIC | Tan | Y |
| PV FAST YELLOW HG | PIGMENT YELLOW 180 | ORGANIC | YELLOW | Y |
| IRGALITE YELLOW WGPH | PIGMENT YELLOW 168 | ORGANIC | YELLOW | N |
| PV FAST YELLOW HGR (11-3071) | PIGMENT YELLOW 191 | ORGANIC | YELLOW | Y |
| PALIOTOL YELLOW K 2270 | PIGMENT YELLOW 183 | ORGANIC | YELLOW | Y |
| CROMOPHTAL YELLOW HRPA | PIGMENT YELLOW 191:1 | ORGANIC | YELLOW | Y |
| CROMOPHTAL YELLOW GRP | PIGMENT YELLOW 95 | ORGANIC | YELLOW | Y |
| IRGALITE YELLOW WSR-P | PIGMENT YELLOW 62 | ORGANIC | YELLOW | N |
| CROMOPTHAL YELLOW 3RLP | PIGMENT YELLOW 110 | ORGANIC | YELLOW | Y |
| 9766 FD&C YELLOW # 6 | PIGMENT YELLOW 104 | ORGANIC | YELLOW | Y |
| 9765 FD&C YELLOW # 5 | PIGMENT YELLOW 100 | ORGANIC | YELLOW | Y |
| PALIOTOL YELLOW K 0961 (HD) | PIGMENT YELLOW 138 | ORGANIC | YELLOW | Y |
| SICOPLAST YELLOW 10-0770 | PIG YEL 138/ PIG YEL 183 | ORGANIC | YELLOW | Y |
| SICOTAN YELLOW K 2001 FG | PIGMENT BROWN 24 | INORGANIC | YELLOW | Y |
| SICOTAN YELLOW K 1011 | PIGMENT YELLOW 53 | INORGANIC | YELLOW | Y |
| COLORTHERM 10 | PIGMENT YELLOW 42 | INORGANIC | YELLOW | Y |

*As publicized by the commercial producer or as tested by the applicant, or both.

Table 2 shows 14 commercially available dyes.

TABLE 2

Commercial Dye Colorants

| Raw Material Name | CI Name | Family | Color | FDA* |
|---|---|---|---|---|
| Lambdaplast Blue NL | Solvent Blue 59 | Anthraquinone | Blue | N |
| Macrolex Blue RR Granular | Solvent Blue 97 | Anthraquinone | Blue | N |
| Macrolex Green G Granular | Solvent Green 28 | Anthraquinone | Green | N |
| Macrolex Green 5B Granular | Solvent Green 3 | Anthraquinone | Green | N |
| Macrolex Orange R Granular | Disperse Orange 47 | Polymethine | Orange | N |
| Macrolex Orange 3G Granular | Solvent Orange 60 | Perinone | Orange | N |
| Macrolex Red EG Granular | Solvent Red 135 | Perinone | Red | N |
| Macrolex Red E2G Granular | Solvent Red 179 | Perinone | Red | N |
| Thermoplast Red 454 | Solvent Red 195 | Anthraquinone | Red | N |
| Macrolex Red Violet R Granular | Disperse Violet 26 | Anthraquinone | Violet | N |
| Macrolex Violet B Granular | Solvent Violet 13 | Anthraquinone | Violet | N |
| Macrolex Violet 3R Granular | Solvent Violet 36 | Anthraquinone | Violet | N |
| Key Plast Yellow 3G | Solvent Yellow 93 | Pyrazolone | Yellow | N |
| Key Plast Yellow AG | Solvent Yellow 114 | Quinophthalone | Yellow | N |

*As publicized by the commercial producer or as tested by the applicant, or both.

Achievement of a color match of a plaque with a desired color from the creativity of a designer or a pre-arranged color standard such as Pantone® color standards from an inventory of commercially available colorants is relatively straightforward for a skilled color matcher, even if a few iterations are required to satisfy the customer.

For example, to simulate the coloration of cedar wood, a combination of four pigments can be used: tan, white, red, and black.

The concentration of colorant into a carrier is significant because of the relative cost of the colorant ingredient(s) and the need for that color to consistently and precisely mix and disperse into the carrier and then to consistently and precisely color the biofiber.

Surfactant

Surfactants are used to aid in dispersion of dyes and pigments. Commercially available surfactants include Surfynol brand defoaming oxirane surfactants from Air Products and Chemicals, with Surfynol CT-324 being preferred to "wet" the biofiber in order to assist the coloration coating to form on the biofiber.

Optional Functional Additives

Additives to improve processing or performance of the colorants of the present invention, can be added according to preferences of this skilled in the art. For example, functional additives can include anti-oxidants, UV absorbers, wood stabilizers, anti-stats, blowing agents, biocides, organoclays, defoaming agents, pH modifiers, and the like.

Generally, minor amounts of such additives provide improvement of performance to the biofiber polymer compoound during processing or in performance of the finished article after manufacturing. One skilled in the art without undue experimentation can determine the appropriate concentration.

Frequently, the preparation of a colored plastic article does not involve merely color but also special effect features, such as Granite, Translucent, Pearls, Metallics, Fluorescents, Iridescents, Marbles, etc.

Non-limiting examples of such additives are commercially available from PolyOne Corporation of Avon Lake, Ohio, USA (www.polyone.com) and marketed under the following brands: OnColor FX colorants, PolyOne colorants, etc.

Wood fiber is composed of lignin, cellulose and hemi cellulose. When wood fiber is exposed to natural sun light, the lignin degrades and exposes the cellulose. The cellulose is light in color and the wood appears "bleached". The color stability of the wood fiber can be improved by treating the fibers with UV absorbers and photo stabilizers that minimize the degradation of lignin. The polymer that is used in the biofiber compound of the present invention is also susceptible to degradation and should be stabilized by the addition of UV absorbers and stabilizers.

Commercially available UV absorbers for treating wood are sold under the Tinuvin brand by Ciba Specialty Chemicals. An example of a product that can be used to treat wood is Tinuvin 477 DW. This is an aqueous UV absorber preparation developed for water borne coatings. The UV absorber in Tinuvin 477 DW is based on a red shifted hydroxyl-phenyl-triazine chromophore, is very heat stable and provides long wave length UV-A range protection. An example of a photo stabilizer for wood protection is sold under the Lignostab 1198 brand also by Ciba Specialty Chemicals. Lignostab 1198 stabilizer is a water soluble HALS stabilizer and inhibits the photo oxidation of lignin and protects the color of wood. It works well in combination with a UV absorber like Tinuvin 477 DW absorber.

Commercially available sodium silicate binders are sold by PQ Corporation located at Valley Forge, Pa. Sodium silicate can be incorporated along with film-forming polymers in coatings. The advantages include cost savings, increased flame retardancy, and increased resistance to heat, light, oxidation and microbial degradation. A grade particularly suitable when using evaporation drying is Sodium Silicate N. This product is a syrupy liquid with a viscosity of 1.8 poise and density of 11.6 lbs/gallon.

Table 3 shows the acceptable, desirable and preferred weight percents of ingredients for biofiber colorant compositions of the present invention.

TABLE 3

| Ingredient (Wt. %) | Acceptable Range | Desirable Range | Preferred Range |
|---|---|---|---|
| Carrier (de-ionized water) | 15-60% | 20-40% | 20-25% |
| Binder | 5-15% | 7-12% | 8-10% |
| Colorant | 2-75% | 50-70% | 60-65% |
| Surfactant | 0.5-10% | 0.5-5% | 1-4% |
| Optional Functional Additives | 0-10% | 0-5% | 0-3% |

The mixing equipment used to make the liquid colorant composition can be any suitable equipment already used in the art of making liquid color, inks or paint type products. For example, such equipment includes high speed 1"Cowles" type dispersers, media mills, three-roll mills and rotor-stator type dispersers.

Mixing equipment can operate at mixing speeds ranging from about 100 rpm to about 10,000 rpm, and preferably from about 500 to about 8000 rpm. Mixing equipment can operate at temperatures ranging from about 25° C. to about 100° C., and preferably from about 60° C. to about 100° C.

The liquid colorant composition is made by charging the mixing vessel with the liquid ingredients and mixing them for a period of 1 minute at low speed (1000 rpm for a 2 inch (5.1 cm) diameter blade disperser). The speed is increased to 5000 rpm and the pigments are added gradually and mixing continued for additional 15 minutes until the required grind is achieved. An optional step of milling using a 3 roll mill or media mill can be employed to increase the degree of dispersion or when using difficult to disperse pigments.

Biofiber

For avoidance of doubt, "biofiber" refers to both a single fiber of naturally-occurring particulate material as well as a plurality of many fibers. As is often the case in the English language, what appears to be a singular also includes many of the same, for example, when referring to sheep and other herding animals.

Any naturally-occurring particulate material is a candidate for being coated by the composition of the present invention. The attention given to renewable resources of naturally-occurring materials for use in plastic articles has opened markets for supply of many different types of plant matter and animal matter.

Non-limiting examples of plant matter include wood fiber, wood flour, flax, fibrils of grass, fragments of shells, and the like. Wood fiber is most prevalent, particularly pine.

Non-limiting examples of animal matter include mammalian hair, bone fragments, organic shells, reptilian hides, and the like.

The biofiber can have an aspect ratio ranging from about 1 to about 100, and preferably from about 2 to about 10. The biofiber can have a length ranging from about 10 microns to about 6 mm, and preferably from about 50 microns to about 2 mm.

A mixture of different biofiber types can be used in the invention to create different colorations and textures in the final plastic article designed to simulate natural wood.

Table 4 shows the acceptable, desirable and preferred weight percents of ingredients for coating biofiber with colorant compositions of the present invention.

TABLE 4

| Ingredient (Wt. %) | Acceptable Range | Desirable Range | Preferred Range |
| --- | --- | --- | --- |
| Colorant Composition | 1-12% | 1-10 | 2-9% |
| Biofiber | 60-90% | 70-85% | 75-80% |
| Water | 2-20% | 5-15% | 10-15% |
| Optional stabilization package | 0-5% | 0.5-4% | 1-3% |

The mixing equipment used to coat the biofiber can also be any suitable equipment already used in the art of mixing liquids and solids together, especially high intensity mixing equipment also capable of operating at an elevated temperature. Examples are high intensity mixers available under trade names "Henschel" or "Welex" or plow mixers manufactured by the Littleford-Day Company. Such mixers are equipped mixing elements that product intense mixing of liquid and dry ingredients. These mixers can also be equipped with a cooling or heating jacket for controlling the temperature of the batch.

Mixing equipment can operate at mixing speeds ranging from about 100 rpm to about 5000 rpm, and preferably from about 500 to about 3000 rpm. Mixing equipment can operate at temperatures ranging from about 25° C. to about 100° C., and preferably from about 60° C. to about 100° C.

The mixing speed can be arranged in stages, with lower speeds being used initially to disperse the colorant composition into the mass of biofiber and then a higher speed to thoroughly integrate the liquid with the solid and break any "agglomerates".

The biofiber is charged to a 200 liter capacity, Henschel type mixer. The liquid colorant and water are added to the mix. Mixing is carried out in two stages: low speed (885 rpm for a 200 liter mixer) for 60 seconds and high speed (1765 rpm for a 200 liter mixer) for about 80 seconds. The batch is inspected to ensure that the coating is uniform and then discharged.

Usefulness of the Invention

Coated colored biofiber can be used as an ingredient in WPC building materials and any other plastic article intended to simulate a naturally-occurring material. The coated colored biofiber can be letdown into plastic resins and other ingredients useful for making molded or extruded articles in weight percents ranging from about 10% to about 80%, and preferably from about 50% to about 70%.

As stated previously, the plastic resins can be such as acrylonitrile-butadiene-styrene (ABS), polyvinyl chloride (PVC), polybutylene terephthalate (PBT), polymethyl methacrylate (PMMA), styrene-acrylonitrile (SAN), polyphenylene ether (PPE), polycarbonate(PC), styrene-butadiene-styrene (SBS), acrylic polymers, polyolefins, and the like.

Other ingredients used in the plastic compounding can include additional colorants, ultraviolet stabilizers, processing aids, and the like.

Other embodiments appear in the examples.

EXAMPLES

Table 5 shows a colorant composition used to prepared coated biofiber of the present invention.

TABLE 5

| Colorant Composition | | | |
| --- | --- | --- | --- |
| Ingredient Name | Brand Name | Commercial Source | Weight Percent (%) |
| De-ionized water carrier | N/A | Various | 23.15 |
| Resin binder | Esicryl 740 Styrene-acrylic emulsion | Cook Composites and Polymer, Kansas City, KS | 9.2 |
| Ammonium Hydroxide pH booster | N/A | Various | 0.45 |
| Surfactant to disperse pigment and wet wood fiber | Surfynol CT-324 | Air Products and Chemicals, Allentown, PA | 2 |
| Defoamer | Surfynol MD-20 | Air Products and Chemicals, Allentown, PA | 0.2 |
| Pigment | Ferritan FZ-1000 Tan | Elementis | 47.320 |
| Pigment | Tiona 696 $TiO_2$ White | Millennium | 11.310 |
| Pigment | R-481 red iron oxide | Delta Colours | 5.92 |
| Pigment | Raven 1170 carbon black | Degussa | 0.45 |

The ingredients were mixed as follows:

To a stainless vessel, the liquid ingredients are first added and mixed at 1000 rpm using a Cowles type disperser fitted with a 2 inc (5.1 cm) diameter blade. After mixing the liquid ingredients for 1 minute, the speed is increased to 5000 rpm and the pigments are added. The mixing is continued for an additional 15 minutes and the batch is then completed.

Table 6 shows the ingredients to make coated colored wood fiber of Examples 1 and 2, compared with Comparative Example A, which was uncolored, uncoated, natural wood fiber. Table 6 also shows the mixing parameters for making Examples 1 and 2.

TABLE 6

| Ingredient Name (Wt. %) | Example 1 (Cedar) | Example 2 (Cedar) | Comparative Example A, Control |
|---|---|---|---|
| Recipes for Coated Wood Fiber | | | |
| Wood fiber (150-500 microns, 2% moisture) | 85% | 83% | 100% |
| Colorant Composition from Table 5 | 3% | 3% | |
| Water | 12% | 12% | |
| Mixing Conditions for Making Coated Wood Fiber | | | |
| Mixing Equipment | High intensity mixer | High intensity mixer | None |
| Mixing Temp. | 90-93° C. | 96° C. | |
| Mixing Speeds and Durations | Low speed 885 RPM for 60 seconds, followed by High speed 1765 RPM for 80 seconds | First Stage: Low speed 885 RPM for 60 seconds, followed by High speed 1765 RPM for 80 seconds. Second Stage after addition of 2 wt. % sodium silicate: Mixed low speed 885 RPM for 30 seconds and then high speed 1765 RPM for 40 seconds | |
| Order of Addition of Ingredients | Wood fiber, color and water at beginning. | Wood fiber, color and water in first stage and then sodium silicate added in second stage | |
| Form of Product After Mixing | Solid wood fibers coated with bound pigment | Solid wood fibers coated with bound pigment | |

Table 7 shows the recipes for thermoplastic compounds made using the coated wood fiber of Examples 1 and 2 and Comparative Example A.

TABLE 7

Wood Plastic Composite

| Ingredient | Example 3 (Wt. %) | Example 4 (Wt. %) | Comparative Example B (Wt. %) |
|---|---|---|---|
| Coated colored wood fiber (Dried to less than 1% moisture) | 60% of Example 1 | 60% of Example 2 | 60% of Comparative Example A |
| Color concentrate (CC 10059309WE from PolyOne Corporation) | 1% | 1% | 2% |
| UV package (CC 00005519WE from PolyOne Corporation) | 1.36% | 0.35% | |
| Process aid (TPW 104 from Strucktol) | 6% | 6% | 6% |
| Resin (High Density Polyethylene from MasterMark) | 31.64% | 32.65% | 32% |

Examples 3 and 4 and Comparative Example B were made into simulated wood boards having dimensions of 4 feet long×5.25 inches wide×1 inch thick (1.21 m×13.34 cm×2.54 cm) by mixing the ingredients using a counter rotating, conical twin screw extruder. The screw rpm was 19, and the melt temperature was 352° F. (178° C).

Table 8 shows another colorant composition used to prepared coated biofiber of the present invention.

Table 9 shows examples of several recipes used to prepare colored biofiber samples.

Table 10 shows the recipes for the thermoplastic compounds made from examples of coated wood fibers from Table 9

TABLE 8

Colorant Composition

| Ingredient Name | Brand Name | Commercial Source | Weight Percent (%) |
|---|---|---|---|
| De-ionized water carrier | N/A | Various | 23.15 |
| Resin binder | Esicryl 740 Styrene-acrylic emulsion | Cook Composites and Polymer, Kansas City, MO | 9.2 |
| Ammonium Hydroxide pH booster | N/A | Various | 0.45 |
| Surfactant to disperse pigment and wet wood fiber | Surfynol CT-324 | Air Products and Chemicals, Allentown, PA | 2 |
| Defoamer | Surfynol MD-20 | Air Products and Chemicals, Allentown, PA | 0.2 |
| Pigment | Sicotan Yellow K2001 FG | BASF | 41.30 |
| Pigment | Tiona 696 TiO$_2$ White | Millennium | 11.21 |
| Pigment | R-481 red iron oxide | Delta Colours | 11.81 |

TABLE 8-continued

Colorant Composition

| Ingredient Name | Brand Name | Commercial Source | Weight Percent (%) |
|---|---|---|---|
| Pigment | Raven 1170 carbon black | Degussa | 0.68 |

TABLE 9

Coated Wood Fiber Composition

| Ingredient Name (Weight %) | Comp. C | Ex. 6 | Ex. 7 | Ex. 8 | Ex. 9 | Ex. 10 | Ex 11 | Ex 12 |
|---|---|---|---|---|---|---|---|---|
| Wood fiber (150-500 microns), 2% moisture | 100% | 85% | 84% | 84% | 85% | 84% | 76% | 76% |
| Colorant Table 5 | | 3% | 6% | 9% | | | 3% | |
| Colorant Table 8 | | | | | 3% | 6% | | 3% |
| Water | | 12% | 10% | 7% | 12% | 10% | 15% | 15% |
| Lignostab 1198 | | | | | | | 1% | 1% |
| Tinuvin 477 DW | | | | | | | 5% | 5% |

TABLE 10

Wood Plastic Composite

| Ingredient | Comp. D | Ex 13 | Ex 14 | Ex 15 | Ex 16 | Ex 17 | Ex 18 | Ex 19 |
|---|---|---|---|---|---|---|---|---|
| Coated color fiber (dried to less than 1% moisture) | 50% of Comp. C | 50% of Ex 6 | 50% of Ex 7 | 50% of Ex 8 | 50% of Ex 9 | 50% of Ex 10 | 50% of Ex 11 | 50% of Ex 12 |
| Color concentrate (CC 10059309WE from PolyOne Corporation) | 2% | | | | | | | |
| Process aid (TPW 104 from Strucktol) | 4% | 4% | 4% | 4% | 4% | 4% | 4% | 4% |
| HDPE resin (0.5 MI copolymer HP-5460 flake from Ineos Polyolefins) | 44% | 46% | 46% | 44% | 46% | 46% | 46% | 46% |

Examples 13-19 and Comparative Example D were made into strips 4 feet long, 2 inches wide and ⅛ inch thick (1.21 m×5.1 cm×0.32 cm) using a Brabender Plasti-Corder mixer equipped with a conical twin screw extruder. The screw speed was 20 rpm and the melt temperature was approximately 380° F. (193° C.).

Boards from Table 7 were then tested under accelerated aging using a Q-Panel, QUV using ASTM method D4329-99/Outdoor. This method employs 20 hrs of light cycle @50° C. and 4 hrs of dark condensation cycle @45° C. After 2000 hours of exposure, boards from Examples 3 and 4 retained their color much better than the board from Comparative Example B. FIG. 1 shows photo images of the weathered boards.

Figure 2:
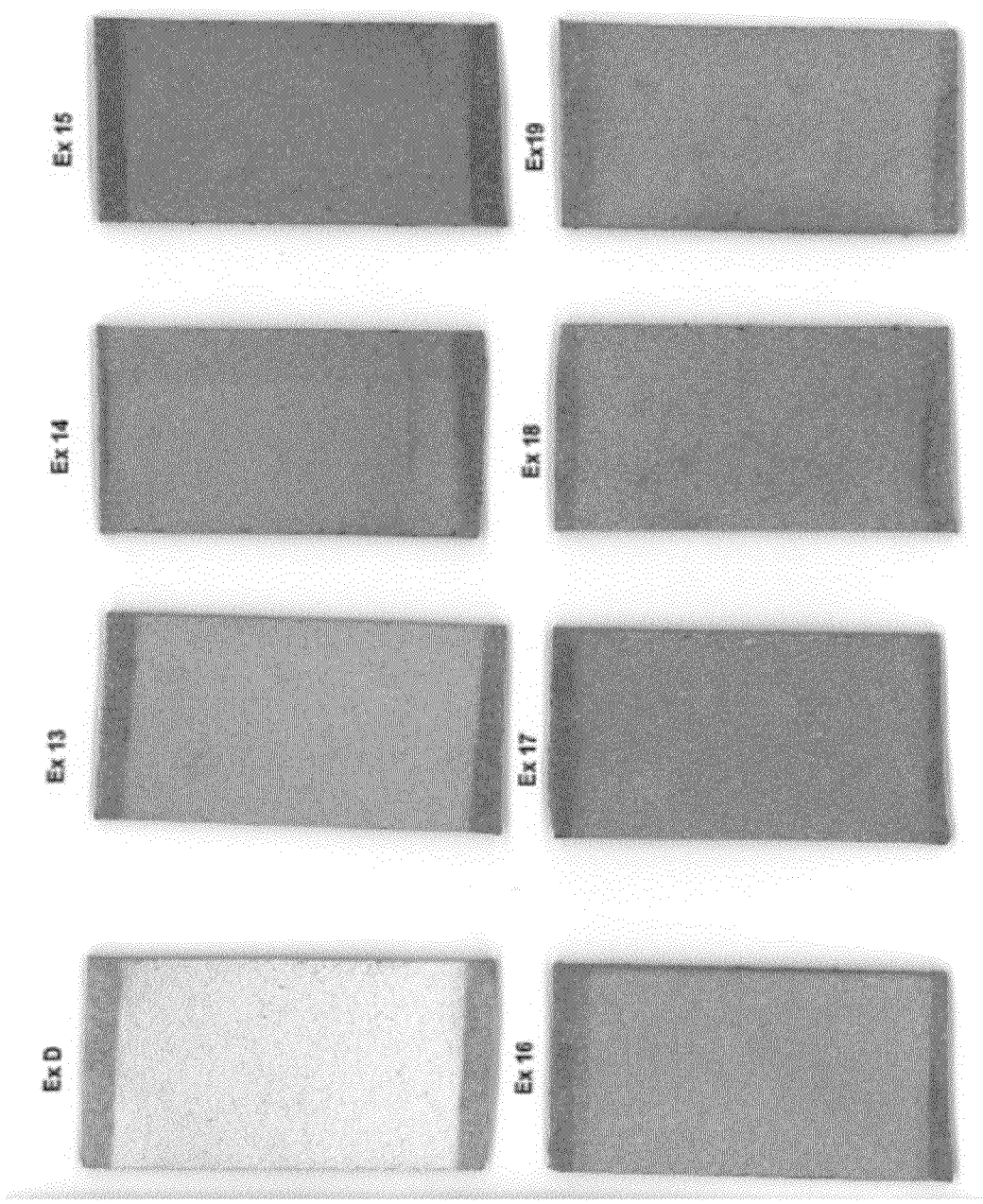
FIG. 2 is another comparison photo image of samples of compounds of the present invention and a control.

Strips from Table 10 were tested under accelerated aging using a Q-Panel, QUV using the following conditions: 8 hrs UV at 60° C., 4 hrs condensations at 50° C. After 2000 hours of exposure, strips that were made with the coated wood fiber (Examples 13-19) retained their color much better than the Comparative Example D strip. FIG. 2 shows photo images of the weathered strips.

The invention is not limited to the above embodiments. The claims follow.

What is claimed is:

1. A thermoplastic compound, comprising:
   (a) thermoplastic resin and
   (b) coated colored biofiber,
   wherein the coated colored biofiber comprises
   (1) biofiber,
   (2) a coating on the biofiber comprising a colorant composition after carrier has been removed, and, optionally
   (3) a UV absorber, a photo stabilizer, or both, wherein the colorant composition comprises:
   (a) a carrier in an amount ranging from about 15 to about 60 weight percent of the colorant composition;
   (b) binder;
   (c) colorant; and
   (d) surfactant, and optionally
   (e) at least one functional additive selected from the group consisting of pH modifier and defoaming agent.

2. The compound of claim 1, wherein the biofiber is a naturally-occurring particulate material.

3. The compound of claim 1, wherein the thermoplastic resin is selected from the group consisting of acrylonitrile-butadiene-styrene (ABS), polyvinyl chloride (PVC), polybutylene terephthalate (PBT), polymethyl methacrylate (PMMA), styrene-acrylonitrile (SAN), polyphenylene ether (PPE), polycarbonate(PC), styrene-butadiene-styrene (SBS), and acrylic polymers, polyolefins, and combinations thereof.

4. The compound of claim 1, wherein the colorant in the coated colored biofiber comprises a pigment, a dye, a combination of pigments, a combination of dyes, a combination of pigments and dye, a combination of pigment and dyes, or a combination of pigments and dyes.

5. The compound of claim 1, wherein the binder in the coated colored biofiber is a film-forming polymer compatible with polyolefins, polyvinyl halides, or both.

6. The compound of claim 1, wherein binder in the coated colored biofiber is selected from the group consisting of acrylics, styrene-acrylics, styrene-butadienes, polyurethanes, vinyl acetate, and vinyl acrylics.

7. The compound of claim 1, wherein the binder in the coated colored biofiber is capable of melting at a temperature of less than about 100° C. but also capable of forming a film at a temperature above about 25° C.

8. The compound of claim 1, wherein the binder in the coated colored biofiber is present in the composition in an amount ranging from about 5 to about 15 weight percent, wherein the colorant is present in the composition in an amount ranging from about 2 to about 75 weight percent, wherein the surfactant is present in an amount ranging from about 0.5 to about 10 weight percent, and wherein the optional functional additive is present, if at all, in an amount ranging up to 10 weight percent.

9. A method of coloring biofiber, comprising the steps of:
 (a) preparing a colorant composition, and
 (b) mixing the colorant composition and biofiber at an elevated temperature for sufficient time to permit carrier to be removed and allowing other ingredients of the colorant composition to form a colored coating on at least a portion of the biofiber,
wherein the colorant composition for biofiber comprises
(a) a carrier in an amount ranging from about 15 to about 60 weight percent of the colorant composition;
(b) binder;
(c) colorant; and
(d) surfactant, and optionally
(e) at least one functional additive selected from the group consisting of pH modifier and defoaming agent.

10. The method of claim 9, wherein the colorant comprises a pigment, a dye, a combination of pigments, a combination of dyes, a combination of pigments and dye, a combination of pigment and dyes, or a combination of pigments and dyes.

11. The method of claim 9, wherein the binder is a film-forming polymer compatible with polyolefins, polyvinyl halides, or both and wherein the carrier is in an amount ranging from about 20 to about 40 weight percent of the colorant composition.

12. The method of claim 9, wherein the binder is selected from the group consisting of acrylics, styrene-acrylics, styrene-butadienes, polyurethanes, vinyl acetate, and vinyl acrylics and wherein the carrier is in an amount ranging from about 20 to about 40 weight percent of the colorant composition.

13. The method of claim 12, wherein the binder is capable of melting at a temperature of less than about 100° C. but also capable of forming a film at a temperature above about 25° C.

14. The method of claim 9, wherein the binder is present in the composition in an amount ranging from about 5 to about 15 weight percent, wherein the colorant is present in the composition in an amount ranging from about 2 to about 75 weight percent, wherein the surfactant is present in an amount ranging from about 0.5 to about 10 weight percent, and wherein the optional functional additive is present, if at all, in an amount ranging up to 10 weight percent.

15. The method of claim 9, wherein the composition is a coating about the surface of biofiber after the carrier has been removed.

16. The method of claim 15, wherein the biofiber is a naturally-occurring particulate material.

* * * * *